Oct. 4, 1938.   L. C. HESTER   2,132,166
PLOW
Filed Aug. 19, 1937
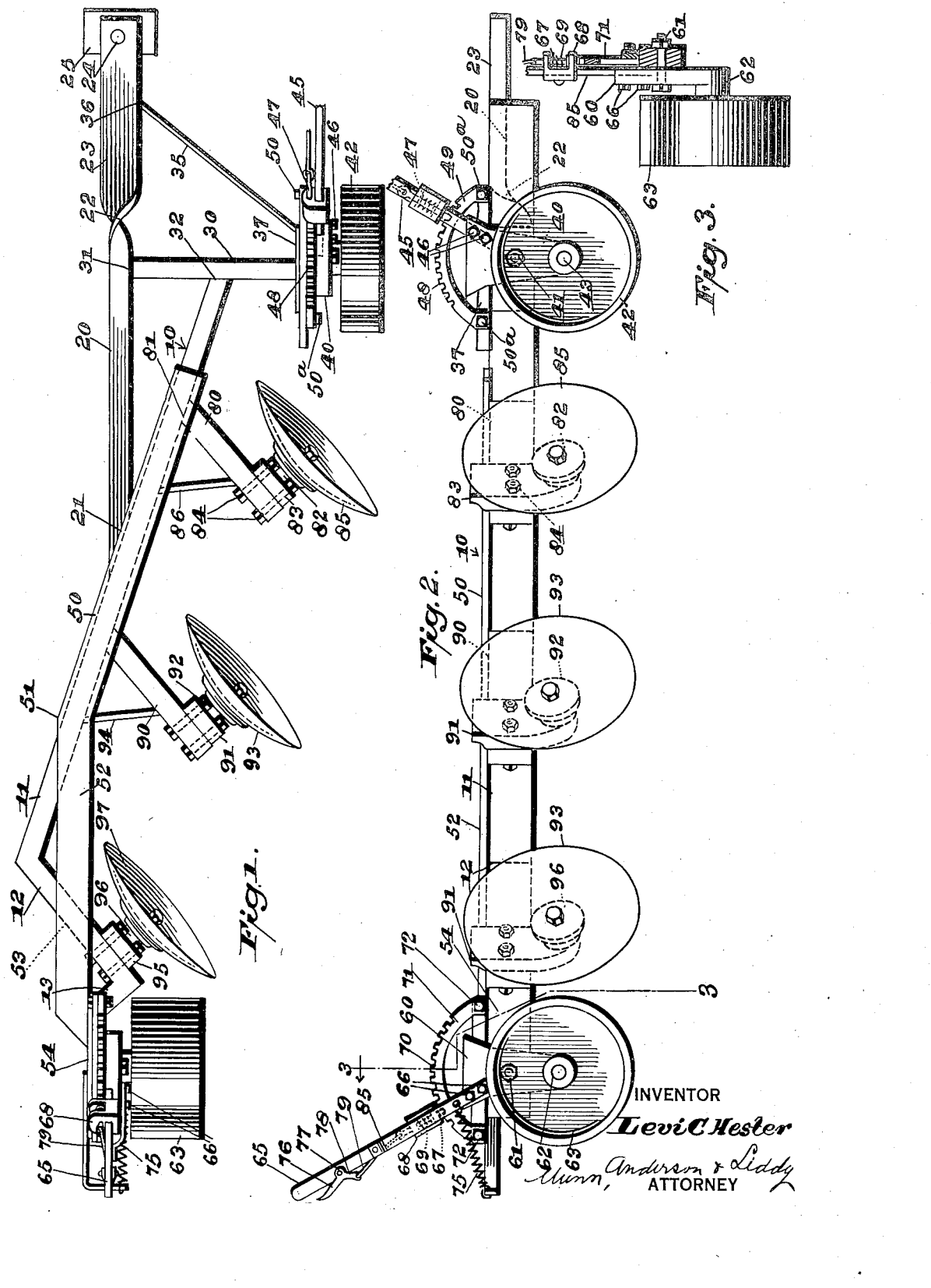

Patented Oct. 4, 1938

2,132,166

UNITED STATES PATENT OFFICE 2,132,166

PLOW

Levi C. Hester, Jacksonville, Fla.

Application August 19, 1937, Serial No. 159,968

5 Claims. (Cl. 97—53)

This invention relates to plows.

An object of the invention is the provision of a one-way disc plow which is provided with a rigid hitch bar directly attached to the draw bar of a tractor so that the plow will fall directly in the path of the tractor thereby eliminating slipping on hillside plowing.

Another object of the invention is the provision of a one-way disc plow which is rigidly connected to the draw bar of a tractor and which is provided with an eccentric mechanism for raising and lowering the plow to provide variations in the depth of the plowing, the plow being supported by wheels having relatively wide rims which will insure the proper position of the plow and penetration.

A further object of the invention is the provision of a one-way disc plow which is adapted to be rigidly connected to the draw bar of a tractor and which has a rigid one-piece straight line frame which is supported by wheels at its opposite ends with plows connected to the frame in staggered relation, the beam of the frame being disposed at an angle to the line of travel of the plow.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a plan view of a plow constructed in accordance with the principles of my invention, Figure 2 is a side view of the plow shown in Figure 1, and Figure 3 is a vertical section taken along the line 3—3 of Figure 2.

Referring more particularly to the drawing 10 designates a longitudinal beam which is composed of a long section 11 and a short section 12. The longer section 11 is inclined at a slight angle to the line of travel of the plow while the shorter section 12 extends at an angle from the rear end of the section 11. The short section 13 of the beam extends rearwardly and is disposed at approximately right angles to the section 12.

A hitch bar 20 is connected at 21 to an intermediate portion of the longer section 11 of the beam 10. The bar is twisted at 22 to provide a horizontal portion 23 which is adapted to be rigidly connected at 24 with a draw bar 25 of a tractor (not shown).

A transverse beam 30 is connected at 31 to an intermediate portion of the hitch bar 20 and extends approximately at a right angle from the hitch bar and is connected with the front end of the beam 10 as shown at 32. The beam 10 is connected to an intermediate portion of the beam 30.

A brace bar 35 is connected at 36 in any approved manner with the forward end 23 of the hitch bar 20. The other end of the bar 35 is connected to a plate 37 which is welded to the outer end of the transverse beam 30.

A crank plate 40 is pivotally mounted on a bolt 41 which is supported by the plate 37. A wheel 42 of considerable width is rotatably mounted on an axle 43 which is carried by the lower end of the plate 40.

A lever 45 is rigidly secured at 46 to the upper end of the plate 40 and above its pivot 41. This lever is provided with a pawl 47 which engages teeth 48 of an arcuately-shaped rack 49 which is secured at 50ª to the plate 37. The pawl 47 is of the usual type and is designed to be released from engagement with teeth 48 against the tension of the spring and in a manner which will be presently described. The lever 45 is adapted to rock the crank plate 40 for raising the axle 43 of the wheel 42 with respect to the beam 10, while the pawl 47 holds the lever and crank plate in position.

A reinforcing plate 50 is welded to the top of the beam 10 but at 51 this plate is turned at an angle to the main portion of the plate so that it will extend rearwardly, as shown at 52, and in a direction which is parallel to the line of travel of the plow. The reinforcing plate is welded to the top of the section 10 of the beam, as shown at 53, and terminates adjacent the rear end of the very short section 13 of the beam. The end of the section 13 and the rear end of the section 52 of the plate 50 are secured to opposite sides of a supporting plate 54.

A crank plate 60 is pivotally mounted upon a bolt 61 which is carried by the supporting plate 54. The lower end of the crank plate is provided with an axle 62 upon which is mounted a flat-faced wheel 63 which has even greater width than the wheel 42.

A lever 65 is rigidly connected at 66 with the crank plate 60 and is provided with a pawl 67 slidably mounted in a bearing 68 against the tension of a spring 69 and has its free end engageable between the teeth 70 of the arcuately-shaped rack 71. This rack is rigidly secured, as shown at 72, with the plate 54. A coil spring 75 is adapted to maintain the lever 65 in its rearward position.

A hand lever 76, pivoted at 77 on the lever 65, has an arm 78 which is connected by a rod or wire 79 with the top of the pawl 67 so that when the lever 76 is rocked the pawl will be released from engagement between the teeth of the rack 71.

The lever 45, the pawl 47 and the related construction, are identical with that of the lever 65, the pawl 67 and its related construction.

An arm 80 is welded at 81 to a side wall of the beam 10 and is extended laterally and slightly rearwardly. An axle 82 is carried in bearings 83 and is bolted at 84 to the outer free end of the arm 80. A coulter plow 85 is rotatably mounted on the axle 82 and is located just behind the plate 40 at the front end of the plow.

A brace bar 86 connects the outer end of the arm 80 with the side wall of the beam 10.

An arm 90 extends laterally from the beam 10 at the rear of the arm 80 and supports bearings 91 at its free end for an axle 92 of a coulter or plow 93. A brace bar 94 connects the outer end of the arm 90 with a side wall of the beam 10.

Bearings 95 secured to the outer end of the section 12 of the beam 10 are adapted to support an axle 96 of the circular coulter or plow 97.

The operation of my device is as follows: The outer end of the hitch bar 20 is connected directly to the draw bar 25 of the tractor so as to swing but not move bodily relative to the tractor and whereby the plow will be guided in a direct line of travel of the tractor and thus prevent side slippage of the tractor.

The wheels 42 and 63 are quite wide as compared to the diameter of these wheels so that these wheels will support the plow above the ground and maintain the plow level at all times and preserve the depth of the plowing or penetration after the plow has been properly set. It will be also noted that the wheel 63 is approximately in the line of travel of the tractor while the wheel 42 is offset laterally whereby the plows 85, 93 and 97 will be supported between parallel lines passing through the hitch bar 20 and the horizontal axis of the wheel 42.

It will be noted that the disposition of the longer portion of the beam 10 provides a staggered arrangement of the plows whereby a considerable width of land is acted on. These plows are arranged at an angle so that the dirt will be drawn in the same direction and when the plow is used for cutting paths in fields it will cut a relatively wide path.

The depth of penetration of the plows is controlled by the levers 45 and 65 by rocking said levers and maintaining said levers in adjusted position by the pawls 47 and 67.

In Figure 2 the wheels 42 and 63 maintain the frame of the plow at the farthest height from the ground. When the pawls are released and the lever 45 is rocked rearwardly and the lever 65 is rocked forwardly the axles 43 and 62 will be moved nearer to the beam 10 whereby the plows will be lowered a predetermined depth into the ground. The positions of the levers 45 and 65 will determine the depth to which the penetration is made. All of the parts of the frame are securely welded together so that they form one unit and the beam 10 is so formed that there will be a direct line of pull for each of the plows when cutting furrows and this will aid materially in conjunction with the rigid connection between the bar 20 and the draw bar 25 for maintaining the plow at all times in the same direction of travel as the tractor.

I claim:

1. A plow comprising a longitudinal beam disposed at a slight angle to the line of travel of the plow, a hitch bar connected at one end to an intermediate portion of said beam, a transverse beam connected to the hitch bar and to the longitudinal beam, a front leveling wheel mounted on the outer end of the transverse beam, a wheel mounted on the rear end of the longitudinal beam, parallel arms secured to the longitudinal beam and located at an acute angle to the line of travel of the plow, the rear end of the longitudinal beam being bent at an angle and disposed parallel to the parallel arms, discs mounted on the ends of the arms, and a reinforcing plate secured to the longitudinal beam and extending from a point adjacent the front end to a point adjacent the bent portion, thence from the last-mentioned point to an intermediate portion of the bent portion when the plate is secured to the bent portion.

2. A plow comprising a longitudinal beam disposed at a slight angle to the line of travel of the plow, a hitch bar connected at one end to an intermediate portion of said beam, a transverse beam connected to the hitch bar and to the longitudinal beam, a front leveling wheel mounted on the outer end of the transverse beam, a wheel mounted on the rear end of the longitudinal beam, parallel arms secured to the longitudinal beam and located at an acute angle to the line of travel of the plow, the rear end of the longitudinal beam being bent at an angle and disposed parallel to the parallel arms, discs mounted on the ends of the arms, a disc mounted on the bent portion of the longitudinal beam, a reinforcing plate having a portion disposed approximately in alignment with the travel of the plow and a portion in alignment with and secured to the longitudinal beam, the first-mentioned portion being secured to an intermediate portion of the bent portion of the longitudinal beam.

3. A plow comprising a longitudinal beam having a bent rear end, a reinforcing plate secured to said beam and having a bent rear end projecting across an intermediate portion of the bent end of the beam and secured thereto, a supporting plate connected to the rear ends of the reinforcing plate and the bent end of the beam, a hitch bar secured to said beam and extending forwardly, a transverse beam secured to the hitch bar and forward end of the longitudinal beam, a supporting plate secured to the end of the transverse beam, wheels mounted for rotation on said supporting plates, and discs carried by the longitudinal beam.

4. A plow comprising a longitudinal beam having a bent rear end, a reinforcing plate secured to said beam and having a bent rear end projecting across an intermediate portion of the bent end of the beam and secured thereto, a supporting plate connected to the rear ends of the reinforcing plate and the bent end of the beam, a hitch bar secured to said beam and extending forwardly, a transverse beam secured to the hitch bar and forward end of the longitudinal beam, a supporting plate secured to the end of the transverse beam, wheels mounted for rotation on said supporting plates, discs carried by the longitudinal beam, and means for raising or lowering the wheels relative to the longitudinal beam.

5. A plow comprising a longitudinal beam having a bent rear end, a reinforcing plate secured to said beam and having a bent rear end projecting across an intermediate portion of the bent end of the beam and secured thereto, a supporting plate connected to the rear ends of the reinforcing plate and the bent end of the beam, a hitch bar secured to said beam and extending forwardly, a transverse beam secured to the hitch bar and forward end of the longitudinal beam, a supporting plate secured to the end of the transverse beam, wheels mounted for rotation on said supporting plates, discs carried by the longitudinal beam, a line passing through the centers of the discs being substantially parallel to the longitudinal beam, said beam being disposed at an angle to the line of travel of the plow.

LEVI C. HESTER.